(12) United States Patent
Duan et al.

(10) Patent No.: US 12,043,759 B2
(45) Date of Patent: Jul. 23, 2024

(54) TITANIUM DIOXIDE MICRO-NANOCONTAINERS, CORROSION-RESISTANT WATERBORNE EPOXY COATING AND PREPARATION METHOD THEREOF

(71) Applicant: Wuhan Research Institute of Materials Protection, Wuhan (CN)

(72) Inventors: Haitao Duan, Wuhan (CN); Yijie Jin, Wuhan (CN); Dan Jia, Wuhan (CN); Shengpeng Zhan, Wuhan (CN); Jiesong Tu, Wuhan (CN); Tian Yang, Wuhan (CN); Wulin Zhang, Wuhan (CN); Lixin Ma, Wuhan (CN); Yinhua Li, Wuhan (CN)

(73) Assignee: Wuhan Research Institute of Materials Protection, Wuhan (CN)

( * ) Notice: Subject to any disclaimer, the term of this patent is extended or adjusted under 35 U.S.C. 154(b) by 0 days.

(21) Appl. No.: 18/072,051

(22) Filed: Nov. 30, 2022

(65) Prior Publication Data

US 2024/0132729 A1    Apr. 25, 2024

(30) Foreign Application Priority Data

Oct. 19, 2022    (CN) .......................... 202211277677.0

(51) Int. Cl.
   *C09D 5/08*    (2006.01)
   *C09D 7/43*    (2018.01)
   (Continued)

(52) U.S. Cl.
   CPC .............. *C09D 5/086* (2013.01); *C09D 7/43* (2018.01); *C09D 7/45* (2018.01); *C09D 7/62* (2018.01);
   (Continued)

(58) Field of Classification Search
   None
   See application file for complete search history.

(56) References Cited

U.S. PATENT DOCUMENTS

| | | | |
|---|---|---|---|
| 11,250,986 B2 * | 2/2022 | Hwang | ................... H01B 3/307 |
| 2006/0155007 A1 * | 7/2006 | Huber | ........................ C09C 1/00 |
| | | | 523/205 |

(Continued)

OTHER PUBLICATIONS

Zhihao Chen et al., Smart coatings embedded with polydopamine-decorated layer-by-layer assembled SnO2 nanocontainers for the corrosion protection of 304 stainless steels, Journal of Colloid and Interface Science, vol. 579 (2020), pp. 741-753.

(Continued)

*Primary Examiner* — Joseph D Anthony
(74) *Attorney, Agent, or Firm* — Zhigang Ma

(57) ABSTRACT

A titanium dioxide micro-nanocontainers, corrosion-resistant waterborne epoxy coatings and preparation method thereof, including preparation steps as follows: $TiO_2$ micro-nano spheres are synthesized by applying hydrothermal method; a polyaniline layer doped with molybdate ions is deposited on the surface of $TiO_2$ micro-nano spheres by adopting the method of in-situ chemical polymerization, $TiO_2$/PANI-$MoO_4^{2-}$ micro-nano-spheres are obtained, then, polydopamine is encapsulated on the surface of $TiO_2$/PANI-$MoO_4^{2-}$ micro-nano spheres to obtain titanium dioxide micro-nanocontainers; next, antirust filler, defoamer, dispersant and thickener are added into waterborne epoxy emulsion, then titanium dioxide micro-nanocontainers are added in the waterborne epoxy emulsion for dispersing and grinding, filtering and encapsulating to obtain component A; the waterborne epoxy curing agent and deionized water are mixed in proportion to obtain component B; component A is stirred, then it is mixed with the component B in proportion, corrosion-resistant waterborne epoxy coatings is obtained.

(Continued)

According to the invention, the titanium dioxide micro-nanocontainers is synthesized and added into the coating as an additive, which can not only improve the compatibility between the filler and the emulsion, but greatly improves the long-term corrosion resistance of the coating by prolonging the release time of the corrosion inhibitors.

1 Claim, 4 Drawing Sheets

(51) Int. Cl.
   *C09D 7/45* (2018.01)
   *C09D 7/62* (2018.01)
   *C09D 7/65* (2018.01)
   *C09D 7/80* (2018.01)
   *C09D 163/00* (2006.01)
   *C09K 15/02* (2006.01)
   *C09K 15/30* (2006.01)

(52) U.S. Cl.
   CPC .............. *C09D 7/65* (2018.01); *C09D 7/80* (2018.01); *C09D 163/00* (2013.01); *C09K 15/02* (2013.01); *C09K 15/30* (2013.01)

(56) References Cited

U.S. PATENT DOCUMENTS

2014/0193889 A1* 7/2014 McDaniel ................ C09D 5/14
                                                      435/264
2015/0191607 A1* 7/2015 McDaniel ............ C09D 5/1625
                                                      424/94.64

OTHER PUBLICATIONS

Zhang Shan et al., Preparation and Corrosion Resistance of PANI/TiO2/ Epoxy Coatings, Journal of Chinese Society for Corrosion and Protection, vol. 36, No. 1, Feb. 2016, pp. 59-66.

* cited by examiner

TITANIUM DIOXIDE MICRO-NANOCONTAINERS, CORROSION-RESISTANT WATERBORNE EPOXY COATING AND PREPARATION METHOD THEREOF

TECHNICAL FIELD

This invention relates to the technical field of coatings and relates to a waterborne coating technology, particularly relates to titanium dioxide micro-nanocontainers, corrosion-resistant waterborne epoxy coating and preparation method thereof.

BACKGROUND

Metal corrosion is the spontaneous process of Gibbs free energy reduction, it extensively limits the application of metal in industry and engineering, and incurs huge economic losses, environmental pollution, even human casualties to society. Adding micro-nano fillers or corrosion inhibitors to waterborne epoxy coatings can directly improve the corrosion resistance time of coatings. Nano-filler reduces the porosity of the coating by filling the gaps present in coating, and improves the physical barrier effect of coating by blocking the corrosion channel. The corrosion inhibitors can improve the defense ability of the substrate against corrosive particles by enhancing metal passivation. However, this direct addition method has some problems, including poor compatibility between micro-nano filler and epoxy coating, easy loss of corrosion inhibitors in water environment, as well as uncontrolled release of corrosion inhibitors, all of which could affect the performance of the coating. The encapsulation and slow release of corrosion inhibitors is the key to solve the above problems and improve the long-term corrosion resistance of the coating. However, the prior art has not provided a slow-release micro-nano filler, therefore, it is urgent to provide an additive of micro-nano filler that have good interface bonding and slow-release performance.

SUMMARY

One of the purposes of this invention is to provide a preparation method of titanium dioxide micro-nanocontainers doped with molybdate corrosion inhibitors. According to the invention, $TiO_2/PANI-MoO_4^{2-}/PDA$ micro-nanocontainers is obtained by layer-by-layer (LBL) assembly technique of titanium dioxide micro-nano spheres, PANI, $MoO_4^{2-}$, PDA and other substances. The titanium dioxide micro-nanocontainers prepared by the invention display good compatibility and slow release, and it can be used as an additive for corrosion-resistant waterborne epoxy coating, which greatly improves the long-term protection ability of the coating to the substrate.

The other purpose of the invention is to provide a corrosion-resistant waterborne epoxy coating and its application. According to the invention, adding the titanium dioxide micro-nanocontainers into the corrosion-resistant waterborne epoxy coating as an additive can solve the problems of poor compatibility between micro-nano filler and epoxy coating, easy loss of corrosion inhibitors in water environment, uncontrolled release of corrosion inhibitors and other issues, which can also fully exploits the protection ability of corrosion inhibitors, prolong the effectiveness of corrosion inhibitors in coating, improve the physical barrier effect of coating and passivation effect of substrate, thus enhancing the long-term protective ability of coating on substrate.

A preparation method of titanium dioxide micro-nanocontainers doped with molybdate corrosion inhibitors, including three preparation steps as follows:

step 1, synthesizing $TiO_2$ micro-nano spheres by using the hydrothermal method;

step 2, depositing a polyaniline layer doped with molybdate ions on the surface of $TiO_2$ micro-nano spheres by using the in-situ polymerization method, obtaining $TiO_2/PANI-MoO_4^{2-}$ micro-nano spheres;

step 3, encapsulating polydopamine on the surface of $TiO_2/PANI-MoO_4^{2-}$ micro-nano spheres, obtaining titanium dioxide micro-nanocontainers doped with molybdate corrosion inhibitors.

This invention uses the method of LBL assembly to dope $PANI-MoO_4^{2-}$, which is used as corrosion inhibitors, then encapsulating polydopamine with slow released function on the surface of Titanium dioxide micro-nano spheres, which is used as carrier, in order to obtain titanium dioxide micro-nanocontainers. The obtained dioxide micro-nanocontainers can solve the problems of poor compatibility between micro-nano filler and epoxy coating, easy loss of corrosion inhibitors in water environment, uncontrolled release of corrosion inhibitors and other issues.

Preferably, the step 1, including specific steps as follows: ammonium fluoride is dissolved in ultrapure water to obtain an ammonium fluoride solution, next, $TiCl_4$ is used as titanium source, and is slowly dropped into the ammonium fluoride solution, then the mixture was poured into a hydrothermal reactor, reacted at 150-170° C. for 4-8 h, the reaction product is centrifuged after cooling it to room temperature, then the centrifuged product washed and dried to obtain $TiO_2$ micro-nano spheres.

Preferably, the step 2, including specific steps as follows: $TiO_2$ micro-nano spheres, sodium dodecyl sulfate, molybdate and aniline are added into water, the materials are mixed and dissolved to obtain a mixed solution, then, ammonium persulfate is slowly dripped into the mixed solution in an ice bath environment, and the mixed solution is stirred while dripping until the color of the solution changes from white to dark green, in-situ polymerization of polyaniline and dope of $MoO_4^{2-}$ is completed on the surface of $TiO_2$ micro-nano spheres, complete reaction is carried out, the reacted material is washed and dried to obtain $TiO_2/PANI-MoO_4^{2-}$ micro-nano spheres.

Preferably, the step 3, including the steps as follows: dopamine (DA) and $TiO_2/PANI-MoO_4^{2-}$ micro-nano spheres are added into Tris-HCl buffer solution (pH=8.5) to obtain a mixture, the mixture is stirred for reaction for 8-14 h, and the reaction product is centrifugal washed and dried to obtain polydopamine modified titanium dioxide micro-nanocontainers ($TiO_2/PANI-MoO_4^{2-}/PDA$).

This invention also provides a corrosion-resistant waterborne epoxy coating, wherein, a formula of the corrosion-resistant waterborne epoxy coating, consisting of component A and component B, and materials in each component is calculated in parts by mass as the following table illustrates:

| Component A | |
|---|---|
| Waterborne epoxy emulsion | 35~55 parts |
| Titanium dioxide micro-nanocontainers | 0~10 parts |
| Anti-rust fillers | 15~40 parts |
| Defoamer | 0.5~5 parts |
| Dispersant | 0.5~5 parts |
| Thickener | 0~5 parts |

-continued

| Component B | |
|---|---|
| Waterborne epoxy curing agent | 7~15 parts |
| Water | 0~10 parts | wherein, the described titanium dioxide micro-nanocontainers are prepared by any one of the preparation methods.

Preferably, the waterborne epoxy emulsion is any one or a combination of type I epoxy emulsion (epoxy equivalent is about 190) and type II epoxy emulsion (epoxy equivalent is about 500).

Preferably, the filler is one or a selective combination of zinc phosphate, aluminum tripolyphosphate, barium sulfate, talcum powder, silicon micropowder and mica flakes.

Preferably, the dispersant is anionic dispersant for waterborne coating.

Preferably, the defoamer is silicone defoamer.

Preferably, the thickener is one or a selective combination of fumed silica, organo bentonite and polyamide wax slurry.

Preferably, the waterborne epoxy curing agent is any one or more of amidated polyamine, polyamide and epoxy-polyamine adduct.

This invention also provides a preparation method of corrosion-resistant waterborne epoxy coating, comprising three preparation steps as follows:

step 1, the anti-rust filler, defoamer, dispersant and thickener are added into the water-borne epoxy emulsion pursuant to the formula ratio, next, the mixture is mixed and ground for 1-3 h with a rotating speed controlled at 2500+/−500 r/min, next, titanium dioxide micro-nanocontainers are added into the mixture for dispersion for 20-50 min, component A of the corrosion-resistant water-borne epoxy coating is obtained;

step 2, waterborne epoxy curing agent is mixed with deionized water in proportion, the mixture is stirred at high speed for 20-50 min to obtain component B of the corrosion-resistant water-borne epoxy coating;

step 3, the component A is stirred and cured for 20-50 min, and is mixed evenly with the component B in proportion, then the coating can be carried out.

Preferably, in step 1, the defoamer is added in three times, and the total amount is not higher than the upper limit of 5% in the formula.

Preferably, in step 1, after mixing and grinding, the grinding fineness should ≤60 μm, and the component A of the corrosion-resistant waterborne epoxy coating is obtained after filtering and packaging with a filter screen.

Preferably, in step 3, the rotating speed of high-speed stirring is 1000-3000 r/min.

The principle of the invention is as follows:

According to this invention, the titanium dioxide nano container is prepared by LBL assembly techniques. The invention is based on the fact that sodium dodecyl benzene sulfonate ($DS^-$) is the anionic surfactant, polyaniline is the $N^+$ polymer chain, molybdate ($MoO_4^{2-}$) is the typical anionic corrosion inhibitors, and polydopamine is the self-polymerization and dihydroxy targeted polymers. The above substances can be LBL assembled by electrostatic action. In particular, PDA is packaged in the outermost layer of micro-nanocontainers loaded with corrosion inhibitors, acting as the "goalkeeper" of corrosion inhibitors release, which avoids rapid leakage of corrosion inhibitors, moreover. When the external pH changes, the local PDA layer can respond to cracking and release molybdate, the released molybdate can react with metallic iron in time to form ferric molybdate, which can firmly attach to the metal surface and provides passivation protection. And at the same time, the amino functional group of PDA can react with epoxy to repair the network structure of the coating damaged by corrosive ions. In addition, the phenolic hydroxyl structure of polydopamine in the outermost layer of the micro-nanocontainers is conducive to improving the compatibility and dispersion of titanium dioxide micro-nano particles in the coating and forming a more uniform protective coating. To sum up, the three interaction mechanisms of slow release of corrosion inhibitors, the repair of epoxy network by poly-dopamine, the physical barrier effect of uniform dispersion of micro-nano particles, can directly prolong the service life of metal substrate in corrosive environment.

According to the invention, the $TiO_2$ micro-nano spheres synthesized by hydrothermal method has the characteristics of high dispersibility and large specific surface area. Therefore, it can be used as carriers, and assembling PANI and doping $MoO_4^{2-}$ on its surface, and encapsulating the micro-nano spheres by PDA to obtain a controllable release $TiO_2$/PANI-$MoO_4^{2-}$ micro-nano spheres. Due to the fact that PDA has good compatibility with epoxy coating and is easy to disperse uniformly in the waterborne epoxy coating, the obtained $TiO_2$/PANI-$MoO_4^{2-}$/PDA micro-nanocontainers can further improve the corrosion resistance of waterborne epoxy coatings, and provide an important guarantee for the development of industry and engineering.

This invention has the beneficial effects as follows:

This invention provides a preparation method of titanium dioxide micro-nanocontainers doped with $MoO_4^{2-}$ corrosion inhibitors, comprising the following steps: $TiO_2$ micro-nano spheres are synthesized by hydrothermal method, a PANI layer doped with $MoO_4^{2-}$ is deposited on the surface of $TiO_2$ micro-nano spheres by in-situ chemical polymerization, and PDA is assembled on the surface of the micro-nano spheres, in order to realize the controllable release of molybdate corrosion inhibitors and overcome the loss efficacy of corrosion inhibitors in adverse environment.

This invention also provides a preparation method of corrosion-resistant waterborne epoxy coating that contains titanium dioxide micro-nanocontainers, which solves the poor compatibility occurred when corrosion inhibitors is added into epoxy resin as additive, furthermore, the coating prepared by this invention has a slow release mechanism, which is conducive for the coating to have a long-term effective inhibition to corrosive particles, and reduce the diffusion penetration rate and frequency of corrosive particles, thus realizing the long-term protection of the coating on the substrate.

DETAILED DESCRIPTION OF EMBODIMENTS

Figure 1:
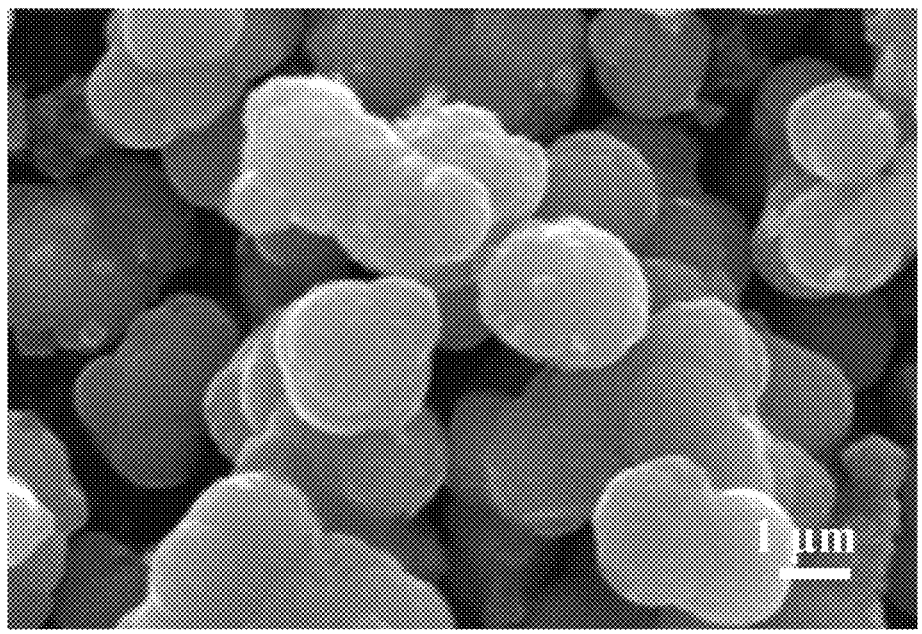
FIG. 1 illustrates a SEM image of titanium dioxide micro-nano spheres synthesized by hydrothermal method in Embodiment 1 of the present invention

In order to better understand the present invention, the concrete embodiment of a corrosion-resistant waterborne epoxy coating containing titanium dioxide micro-nano containers and its preparation method, according to the present invention, was described in detail with reference to the attached drawings and examples. Furthermore, the scope and implementation of the present invention should not be limited by this.

Embodiment 1

The preparation of Titanium dioxide micro-nanocontainers doped with molybdate corrosion inhibitors is described as follows:
  a) $TiO_2$ micro-nano spheres were synthesized by hydrothermal method.
  2.96 g $NH_4F$ is dissolved in 200 mL ultrapure water to obtain a mixed solution, and 2.2 mL $TiCl_4$ is slowly dripped into the solution, then, the mixture is poured into a hydrothermal reactor for reacting at 160° C. for 6 h. After cooling to room temperature, the precipitates had been separated by high-speed centrifugation and washed several times with ethanol and ultrapure water until they became powders, the obtained powders were dried at 70° C. for 12 h to form the $TiO_2$ micro-nano spheres.
  b) Polyaniline (PANI) layer doped with $MoO_4^{2-}$ was deposited on the surface of $TiO_2$ micro-nano spheres by using the in-situ polymerization method. 2.0 g $TiO_2$ microspheres, 0.1 g $SDS^-$, 0.1 g $MoO_4^{2-}$ and 0.8 mL ANI were mixed in 100 mL water solution for 1 h, and then 25 mL of 0.1M $(NH_4)_2S_2O_8$ was slowly dripped into the solution in an ice bath environment, the mixed solution changed from white to dark green, and in-situ polymerization of PANI and $MoO_4^{2-}$ doping were carried out on the surface of $TiO_2$ microspheres, kept mixing and stirring for 2 h to ensure a complete reaction, the reaction product was washed and drying, finally, $TiO_2$/PANI-$MMoO_4^{2-}$ micro-nano spheres was obtained.
  50 mg DA and 0.25 g $TiO_2$/PANI/$MoO_4^{2-}$ micro-nano spheres were added into 50 mL Tris-HCl buffer solution (pH=8.5), the mixture was stirred for 12 h, then it was centrifugally washed and dried to obtain PDA-modified $TiO_2$ micro-nanocontainers ($TiO_2$/PANI-$MoO_4^{2-}$/PDA), which is the titanium dioxide micro-nanocontainers doped with molybdate inhibitors.

Embodiment 2

The preparation method of corrosion-resistant waterborne epoxy coating that contains titanium dioxide micro-nanocontainers comprises the following steps:
  According to the formula ratio, 20 parts of antirust filler, 3 parts of defoamer, 2 parts of dispersant and 2 parts of thickener were added into 52 parts of waterborne epoxy emulsion, and the rotation speed was controlled at 2500+/−500 r/min, the emulsion was mixed and ground for 2 h, 1 part of titanium dioxide micro-nanocontainers was added and dispersed for 30 min, wherein defoaming agent was added in three times, grinding fineness was ≤60 μm, and the powder was filtered and packaged with a filter screen to obtain component A of the corrosion-resistant waterborne epoxy coating, containing titanium dioxide micro-nanocontainers;
  15 parts of waterborne epoxy curing agent and 5 parts of deionized water were mixed in proportion, and stirred at a high speed for 30 min to obtain component B of corrosion-resistant waterborne epoxy coating containing titanium dioxide micro-nano containers;
  The component A was stirred and cured for 30 min, then mixed evenly with the component B in proportion, and coated on the surface of Q235 steel with a coating thickness of 100±5 μm.

The performance test for the corrosion-resistant waterborne epoxy coating that contains micro-nanocontainers of the embodiment 2, and its cured coating. The test results were as follows in Table 1:

TABLE 1

Performance evaluation of the corrosion-resistant waterborne epoxy coating that contains micro-nanocontainers and its cured coating of embodiment 2

| Test item | Performance test | Test standard |
| --- | --- | --- |
| State in Container | After stirring evenly, there are no lumps, and the mixture is uniform | Measuring by sight |
| Coating appearance | Earthly yellow | Measuring by sight |
| Surface drying time, h | 4 | GB/T 1728 |
| Hard drying time, h | 24 | GB/T 1728 |
| VOCs content, g/L | 28.2 | GB/T 23986 |
| Applicable period (normal temperature), h | 3 | GB/T 31416 |
| Film thickness, μm | 101 | GB/T 13452.2 |
| Adhesion with substrate(Q235), MPa | 8.9 | GB/T 5210 |
| Hardness | 3H | GB/T 6739 |
| shock resistance, cm | 50 | GB/T 1732 |
| Neutral salt spray resistance(35 d) | No blistering and peeling of coating | GB/T 1711 |

Embodiment 3

According to the formula ratio, 25 parts of antirust filler, 3 parts of defoamer, 3 parts of dispersant and 1 parts of thickener were added into 45 parts of waterborne epoxy emulsion, and the rotation speed was controlled at 2500+/−500 r/min, the emulsion was mixed and ground for 2 h, 2 part of titanium dioxide micro-nanocontainers was added and dispersed for 30 min, wherein defoaming agent was added in three times, grinding fineness was ≤60 μm, then the powder was filtered and packaged with a filter screen to obtain component A of the corrosion-resistant waterborne epoxy coating, containing titanium dioxide micro-nanocontainers;

14 parts of waterborne epoxy curing agent and 7 parts of deionized water were mixed in proportion, and stirred at a high speed for 30 min to obtain component B of corrosion-resistant waterborne epoxy coating containing titanium dioxide micro-nano containers;

The component A was stirred and cured for 30 min, then mixed evenly with the component B in proportion, and coated on the surface of Q235 steel with a coating thickness of 100±5 μm.

The performance test for the corrosion-resistant waterborne epoxy coating that contains micro-nanocontainers of the embodiment 3, and its cured coating. The test results were as follows in Table 2;

Table 2 Performance evaluation of the corrosion-resistant waterborne epoxy coating that contains micro-nanocontainers and its cured coating of embodiment 3.

Performance evaluation of the corrosion-resistant waterborne epoxy coating that contains micro-nanocontainers and its cured coating of embodiment 3

| Test item | Performance test | Test standard |
| --- | --- | --- |
| State in Container | After stirring evenly, there are no lumps, and the mixture is uniform | Measuring by sight |
| Coating appearance | Earthly yellow | Measuring by sight |
| Surface drying time, h | 3 | GB/T 1728 |
| Hard drying time, h | 15 | GB/T 1728 |
| VOCs content, g/L | 25.1 | GB/T 23986 |
| Applicable period (normal temperature), h | 2.5 | GB/T 31416 |
| Film thickness, μm | 98 | GB/T 13452.2 |
| Bonding force with substrate(Q235), MPa | 8.2 | GB/T 5210 |
| Hardness | 3H | GB/T 6739 |
| shock resistance, cm | 50 | GB/T 1732 |
| Neutral salt spray resistance(35 d) | No blistering and peeling of coating | GB/T 1711 |

Embodiment 4

According to the formula ratio, 18 parts of antirust filler; 3 parts of defoamer; 3 parts of dispersant and 2 parts of thickener were added into 42 parts of waterborne epoxy emulsion, and the rotation speed was controlled at 2500+/−500 r/min, the emulsion was mixed and ground for 2 h, 5 part of titanium dioxide micro-nanocontainers was added and dispersed for 30 min, wherein defoaming agent was added in three times, grinding fineness was ≤60 μm, then the powder was filtered and packaged with a filter screen to obtain component A of the corrosion-resistant waterborne epoxy coating, containing titanium dioxide micro-nanocontainers;

13 parts of waterborne epoxy curing agent and 4 parts of deionized water were mixed in proportion, and stirred at a high speed for 30 min to obtain component B of corrosion-resistant waterborne epoxy coating containing titanium dioxide micro-nano containers;

The component A was stirred and cured for 30 min, then mixed evenly with the component B in proportion, and coated on the surface of Q235 steel with a coating thickness of 100±5 μm.

The performance test for the corrosion-resistant waterborne epoxy coating that contains micro-nanocontainers of the embodiment 4, and its cured coating. The test results were as follows in Table 3;

Performance evaluation of the corrosion-resistant waterborne epoxy coating that contains micro-nanocontainers and its cured coating of embodiment 4

| Test item | Performance test | Test standard |
| --- | --- | --- |
| State in Container | After stirring evenly, there are no lumps, and the mixture is uniform | Measuring by sight |
| Coating appearance | Earthly yellow | Measuring by sight |
| Surface drying time, h | 1.5 | GB/T 1728 |
| Hard drying time, h | 8 | GB/T 1728 |
| VOCs content, g/L | 23.8 | GB/T 23986 |
| Applicable period (normal temperature), h | 2 | GB/T 31416 |
| Film thickness, μm | 103 | GB/T 13452.2 |
| Bonding force with substrate(Q235), MPa | 7.5 | GB/T 5210 |
| Hardness | 3H | GB/T 6739 |
| shock resistance, cm | 50 | GB/T 1732 |
| Neutral salt spray resistance(35 d) | No blistering and peeling of coating | GB/T 1711 |

Figure 2:
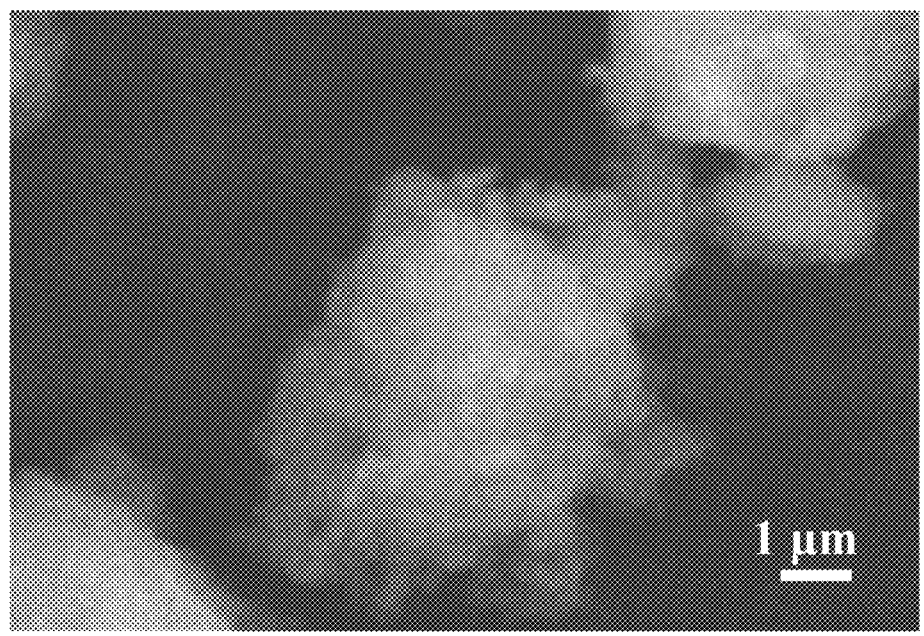
FIG. 2 illustrates a SEM diagram of titanium dioxide micro-nanocontainers assembled layer by layer in Embodiment 1 of the present invention.
Figure 3:
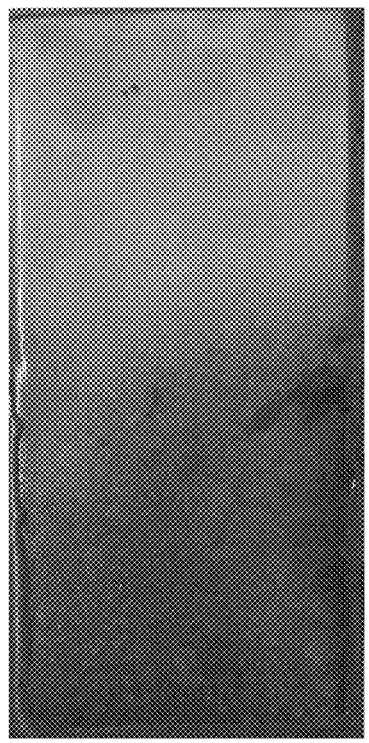
FIG. 3 illustrates 35 d salt spray test of corrosion-resistant waterborne epoxy coating containing titanium dioxide micro-nano spheres.
Figure 4:
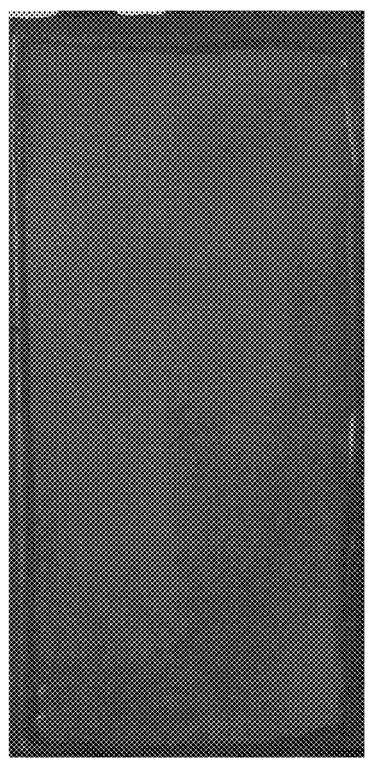
FIG. 4 illustrates 35 d salt spray test of corrosion-resistant waterborne epoxy coating containing titanium dioxide micro-nanocontainers.

Scanning electron microscopy (SEM) was carried out on the titanium dioxide micro-nano spheres and titanium dioxide micro-nanocontainers prepared in Embodiment 1 of the present invention, and SEM images were obtained and illustrated in FIG. 1 and FIG. 2 were obtained, which showed the successful preparation of titanium dioxide microspheres, as well as the morphological changes of titanium dioxide micro-nanocontainers before and after layer by layer assembly, the flocculent substances on the surface are obtained by layer by layer assembly, and the assembly can well improve the compatibility between micro-nanocontainers and waterborne epoxy emulsion. FIG. 3 and FIG. 4 were the salt spray test photos of anti-corrosion waterborne epoxy coating on Q235 samples containing titanium dioxide micro-nano spheres and titanium dioxide micro-nanocontainers, respectively. It can be seen that the protection provided by titanium dioxide micro-nano spheres for the coating was very limited. After the salt spray test for 35 days, obvious corrosion and foaming phenomenon appeared, while the coating, containing titanium dioxide micro-nanocontainers, showed better salt spray resistance, molybdate inhibited the pitting corrosion of the coating well, and poly-dopamine, as a "goalkeeper", controlled the slow and orderly release of corrosion inhibitors, thus enhancing the corrosion resistance and self-repairing ability of the coating, and providing better protection for the substrate.

Finally, it should be noted that the above embodiments are only used to illustrate the present invention, but not to limit it. Although the present invention has been described in detail with reference to the embodiments, it should be understood by those skilled in the art that the technicians can still simplify, combine, modify or replace the specific embodiments of the present invention after reading the specification of this application, but these modifications or changes do not depart from the spirit and scope of the technical scheme of the present invention, and should be covered by the claims of the present invention.

What is claimed is:

1. A preparation method of titanium dioxide micro-nanocontainers doped with molybdate corrosion inhibitors, including three preparation steps as follows:

step 1, synthesizing $TiO_2$ micro-nano spheres by using the hydrothermal method, specifically comprising:

dissolving ammonium fluoride in ultrapure water to obtain an ammonium fluoride solution, next, using TiCL as titanium source, slowly dropping it into the ammonium fluoride solution, then pouring the mixture into a hydrothermal reactor, carrying out reaction at 150-170° C. for 4-8 h, centrifuging the reaction product after cooling it to room temperature, washing and drying the centrifuged product to obtain $TiO_2$ micro-nano spheres;

step 2, depositing a polyaniline layer doped with molybdate ions on the surface of $TiO_2$ micro-nano spheres by using the in-situ polymerization method, obtaining $TiO_2/PANI-MoO_4^{2-}$ micro-nano spheres, specifically comprising:

adding $TiO_2$ micro-nano spheres, sodium dodecyl sulfate, molybdate and aniline into water, mixing and dissolving the materials to obtain a mixed solution, then, slowly dripping ammonium persulfate into the mixed solution in an ice bath environment, and stirring the mixed solution while dripping until the color of the solution changes from white to dark green, completing in-situ polymerization of polyaniline and dope of $MoO_4^{2-}$ on the surface of $TiO_2$ micro-nano spheres, carrying out complete reaction, washing and drying the reacted material to obtain $TiO_2/PANI\text{-}MoO_4^{2-}$ micro-nano spheres;

step 3, encapsulating polydopamine on the surface of $TiO_2/PANI\text{-}MoO_4^{2-}$ micro-nano spheres, obtaining titanium dioxide micro-nanocontainers doped with molybdate corrosion inhibitors, specifically comprising:

adding dopamine and $TiO2/PANI\text{-}MoO42-$ micro-nano spheres into Tris-HCl buffer solution to obtain a mixture, stirring the mixture for reaction for 8-14 h, centrifugal washing and drying the reaction product to obtain polydopamine modified titanium dioxide micro-nanocontainers.

* * * * *